United States Patent
Wu

(10) Patent No.: US 9,134,484 B2
(45) Date of Patent: Sep. 15, 2015

(54) CABLE CONNECTOR

(75) Inventor: Jerry Wu, Irvine, CA (US)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 479 days.

(21) Appl. No.: 13/490,470

(22) Filed: Jun. 7, 2012

(65) Prior Publication Data

US 2012/0314999 A1    Dec. 13, 2012

(30) Foreign Application Priority Data

Jun. 7, 2011    (CN) .......................... 2011 1 0150637

(51) Int. Cl.
*G02B 6/36* (2006.01)
*G02B 6/38* (2006.01)
*H01R 24/64* (2011.01)

(52) U.S. Cl.
CPC ............ *G02B 6/3817* (2013.01); *G02B 6/3821* (2013.01); *G02B 6/3893* (2013.01); *H01R 24/64* (2013.01)

(58) Field of Classification Search
None
See application file for complete search history.

(56) References Cited

U.S. PATENT DOCUMENTS

| | | | |
|---|---|---|---|
| 7,147,519 B2 * | 12/2006 | Reichle ......................... | 439/676 |
| 2007/0105452 A1 | 5/2007 | Gerlach et al. | |
| 2010/0278490 A1 * | 11/2010 | Liao et al. ....................... | 385/90 |
| 2010/0290745 A1 | 11/2010 | Liao et al. | |
| 2011/0091162 A1 * | 4/2011 | He et al. .......................... | 385/75 |
| 2011/0158588 A1 * | 6/2011 | Little et al. ...................... | 385/74 |
| 2011/0194822 A1 * | 8/2011 | Harlan et al. ................... | 385/92 |
| 2011/0194823 A1 * | 8/2011 | Wu .................................. | 385/92 |
| 2011/0229083 A1 * | 9/2011 | Dainese et al. ................. | 385/74 |
| 2011/0243505 A1 * | 10/2011 | Su et al. .......................... | 385/75 |
| 2011/0299816 A1 * | 12/2011 | Yen et al. ........................ | 385/89 |
| 2011/0311187 A1 * | 12/2011 | Wang et al. ..................... | 385/78 |
| 2011/0317962 A1 * | 12/2011 | Malehorn et al. .............. | 385/75 |
| 2013/0129284 A1 * | 5/2013 | Torikai et al. ................... | 385/75 |

FOREIGN PATENT DOCUMENTS

| | | |
|---|---|---|
| CN | 201438225 U | 4/2010 |
| CN | 201828687 U | 5/2011 |
| CN | 201829671 U | 5/2011 |
| JP | 2002357746 A | 12/2002 |
| TW | 201115864 A | 5/2011 |

* cited by examiner

*Primary Examiner* — Mike Stahl
(74) *Attorney, Agent, or Firm* — Wei Te Chung; Ming Chieh Chang

(57) ABSTRACT

A cable connector (100) includes an insulative housing (1), a plurality of contacts (2) retained in the insulative housing (1), a cable (3) connecting to the contacts (2), an optical member (4) retained in the insulative housing (1) and a retaining member (5). The insulative housing (1) includes a pair of opposite front and rear walls (11, 12), a pair of opposite top and bottom walls (13, 14) and a receiving space (121) depressed forwardly from the rear wall (12). The retaining member (5) includes two springs (52) forwardly abuts against the optical member (4) and a positioning block (51) forwardly abuts against the spring (52).

19 Claims, 6 Drawing Sheets

CABLE CONNECTOR

BACKGROUND OF THE INVENTION

1. Field of the Invention

The present invention generally relates to a cable connector and more particularly to a cable connector with an optical member.

2. Description of Related Art

U.S. Patent Application No. 20100290745 discloses a cable connector including an insulative housing, a plurality of contacts retained in the insulative housing, an optical member retained in the insulative housing and a pair of springs. The insulative housing includes a bottom wall and two side walls extending from two sides of the bottom wall. The bottom wall has a receiving slot, a retaining slot extending backwardly from the receiving slot and a blocking portion extending upwardly from a front and a middle of a bottom face thereof. The optical member includes an optical module retained in the insulative housing and two optical fibers received in the optical module. The optical module includes a spacer, two extending portions extending forwardly from the spacer, two posts extending backwardly from the spacer and a pair of optical lenses received in the extending portions and exposed outside. Each of the extending portions includes a passageway slot passing therethrough and the optical lens is received in a front of the passageway slots. At first, one end of the spring is assembled to the post and another end is assembled to the retaining slot and abuts against an inside face of the receiving slot backwardly. And then, the spacer assembles into the receiving slot aslantly, the spacer abuts against the blocking portion forwardly and the extending portion exposes outside forwardly. The springs may has an arc-shaped transformation, which may cause the springs to fly out of the retaining slot and influence the assembly of the optical member.

Other objects, advantages and novel features of the present invention will become more apparent from the following detailed description of the present embodiment when taken in conjunction with the accompanying drawings.

SUMMARY OF THE INVENTION

The present invention provides a cable connector comprises an insulative housing having a pair of opposite front and rear walls, a pair of opposite top and bottom walls and a receiving space depressing forwardly from the rear wall, a plurality of contacts retained in the insulative housing, a cable connecting to the contacts, an optical member retained in the insulative housing and a retaining member having a pair of springs forwardly abuts against the optical member and a positioning block forwardly abuts against the springs. At first, the springs are assembled in the positioning block, and then the positioning block is inserted into the insulative housing horizontally. The spring is got the horizontal force and could not fly out of the insulative housing.

Other objects, advantages and novel features of the present invention will become more apparent from the following detailed description of the present embodiment when taken in conjunction with the accompanying drawings.

DETAILED DESCRIPTION OF THE INVENTION

Figure 1:
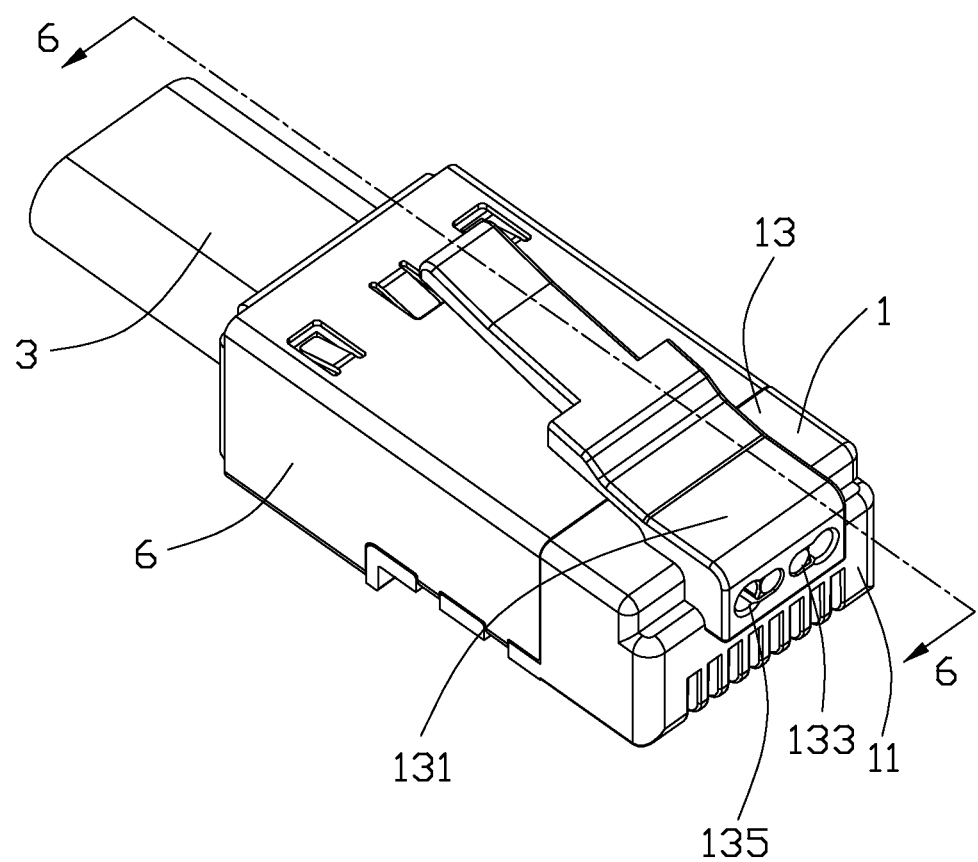
FIG. 1 is an assembled perspective view of a cable connector according to a preferred embodiment of the present invention.
Figure 2:
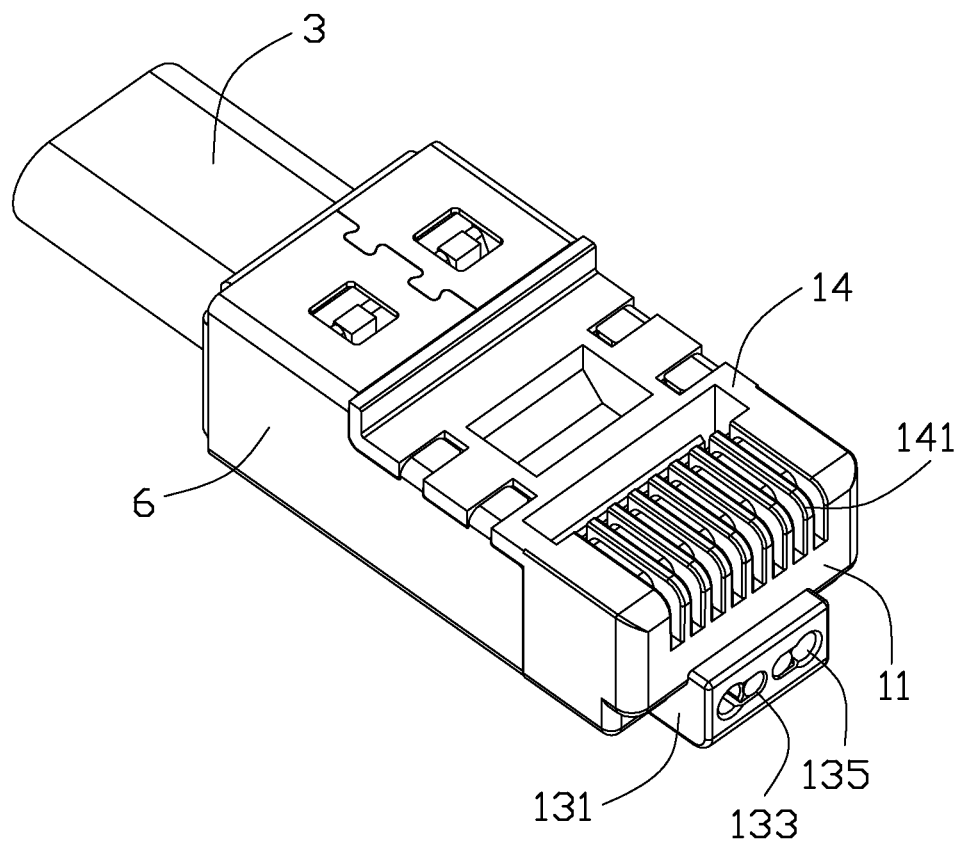
FIG. 2 is an assembled perspective view of the cable connector taken from a bottom side.
Figure 3:
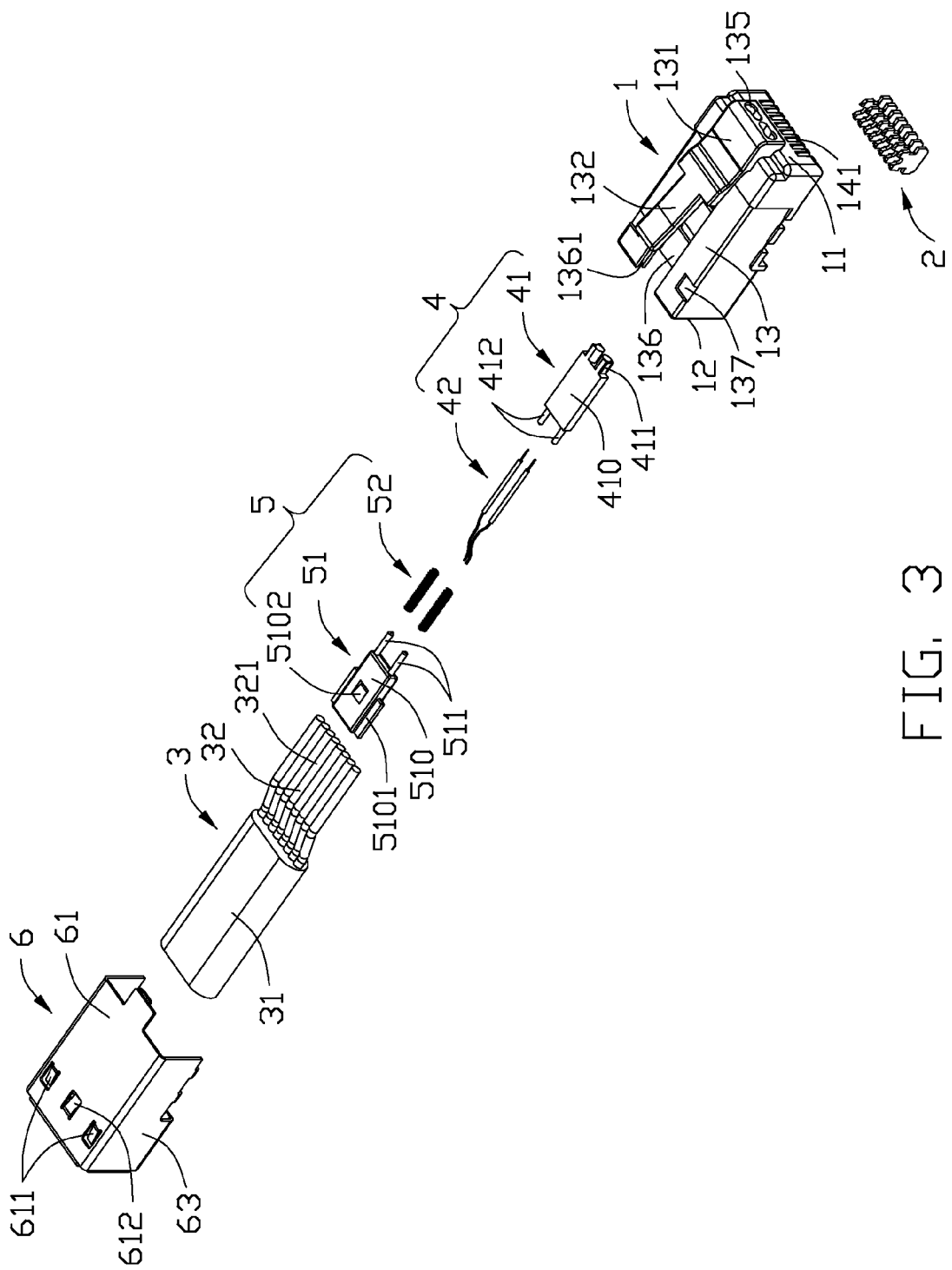
FIG. 3 is an exploded, perspective view of the cable connector as shown in FIG. 1.
Figure 4:
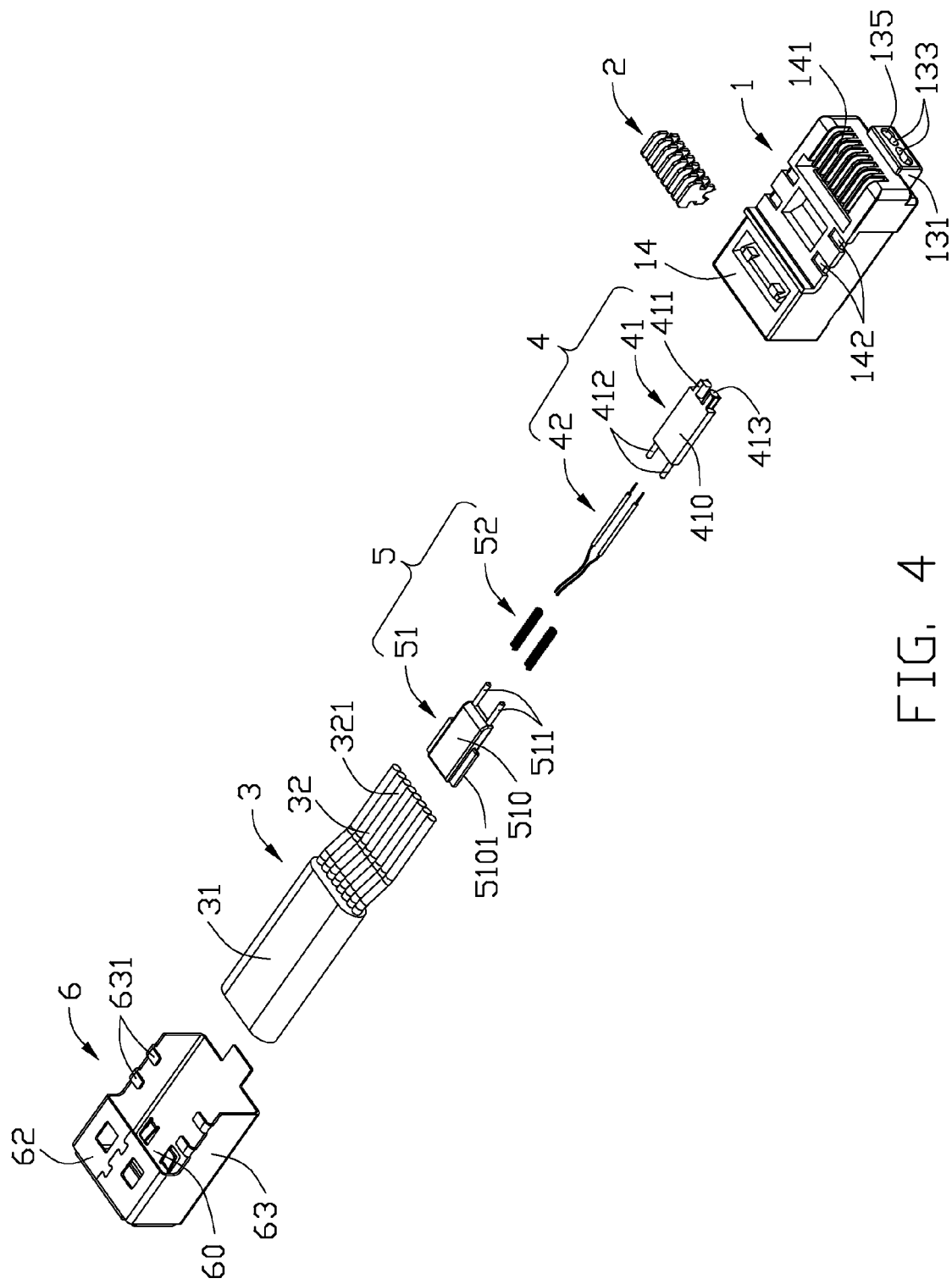
FIG. 4 is another exploded, perspective view of the cable connector similar with FIG. 4.
Figure 5:
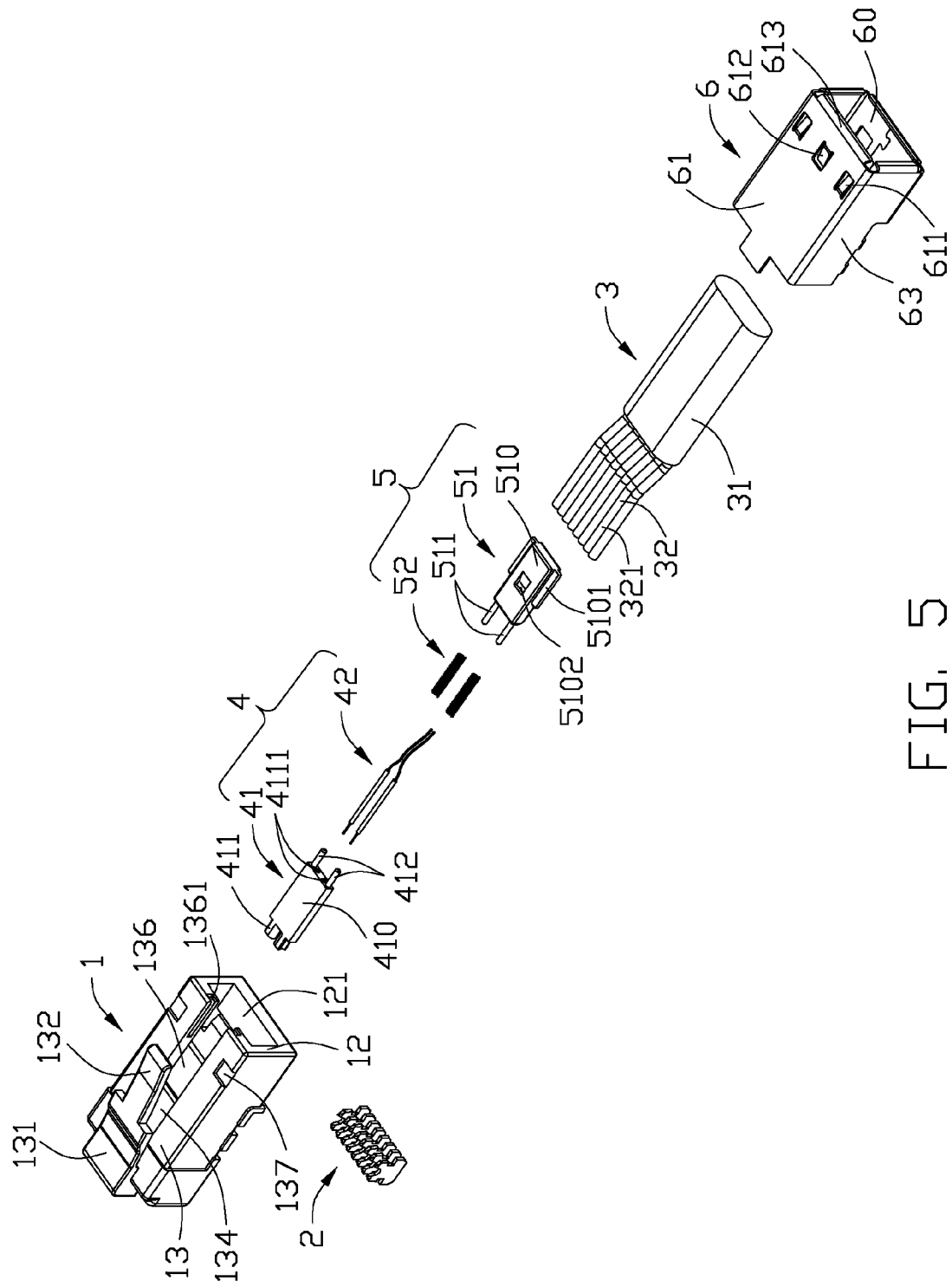
FIG. 5 is similar with FIG. 3.

Reference will now be made to the drawing figures to describe the preferred embodiment of the present invention in detail.

Referring to FIGS. 1-5, a cable connector 100 in this present invention is used to connect with a mating connector. The cable connector 100 includes an insulative housing 1, a plurality of contacts 2 received in the insulative housing 1, a cable 3 connecting with the contacts 2, two optical lens 4 assembled in the insulative housing 1, an optical member 4 received in the insulative housing 1 and a metal shell 6 covering the insulative housing 1.

Referring to FIGS. 1-5, the insulative housing 1 includes a pair of opposite front and rear walls 11, 12, and a pair of opposite top and bottom walls 13, 14. The rear wall 12 includes a receiving space 121 depressing forwardly therefrom (see FIG. 5). The insulative housing 1 includes a protrusion or convex 131 extending beyond the front wall 11 and the top wall 13 and a locking member 132 extending backwardly and aslant from the convex 131 for locking with the mating connector. The convex 131 has a receiving slot 134 for receiving the optical member 4, a pair of through holes 133 and a pair of mounting holes 135 communicating the receiving slot 134 with exterior space, and the mounting holes 135 are located in two sides of the through holes 133 and connect with the through holes 133. The insulative housing 1 includes a plurality of grooves 141 extending on the bottom and front walls 14, 11. The top wall 13 has a passageway slot 136 through the top wall 13 along a top-to-bottom direction, and the passageway slot 136 is forwardly aligned and connect with the receiving slot 134 and passes through the insulative housing 1 backwardly. Two retaining slots 1361 are defined on two sidewalls of the passageway slot 136 and pass through the rear wall 12 of the insulative housing 1 backwardly. The top wall 13 further defines two recessing holes 137 located on two sides of the passageway slot 136. The receiving space 121 communicates with the passageway slot 136. The bottom wall 14 has a plurality of opening slots 142 behind of the grooves 141.

The optical member 4 includes an optical module 41 received in the insulative housing 1 and two optical fibers 42 assembled in the optical module 41. The optical module 41 includes a spacer 410, two extending portions 411 extending forwardly from the spacer 410, a pair of resisting posts 412 extending backwardly from the spacer 410 and a pair of optical lenses 413 retained in the extending portions 411 and exposed outside. Each of the extending portions 411 includes a accommodating slot 4111 passing therethrough, the optical lens 413 is located in a front of the accommodating slot 4111 and the resisting posts 412 are located on two sides of the accommodating slots 4111. The optical fiber 42 inserts into the accommodating slots 4111 along a back-to-front direction and couples with the optical lens 413. The optical module 41 assembles into the receiving slot 134 of the insulative housing 1 along a back-to-front direction, the spacer 410 is received in the receiving slots 134, the extending portions 411 extend into the through holes 133 and the optical lenses 413 expose outside from the through holes 133 of the convex 131.

The retaining member 5 includes a positioning block 51 and a pair of springs 52 assembled in a front of the positioning block 51. The positioning block 51 includes a body portion 510, two retaining posts 511 extending forwardly from the body portion 510 and two locking portions 5101 formed on two sides of the body portion 510 and received in the retaining slots 1361 of the insulative housing 1. The body portion 510 includes a depression 5102 on a top thereof. The locking portion 5101 is thinner than the body portion 510 and has a same length as that of the retaining slot 1361. One end of the spring 52 surrounds the retaining post 511 and the other end of the spring 52 surrounds the resisting post 412 of the optical module 41.

Figure 6:
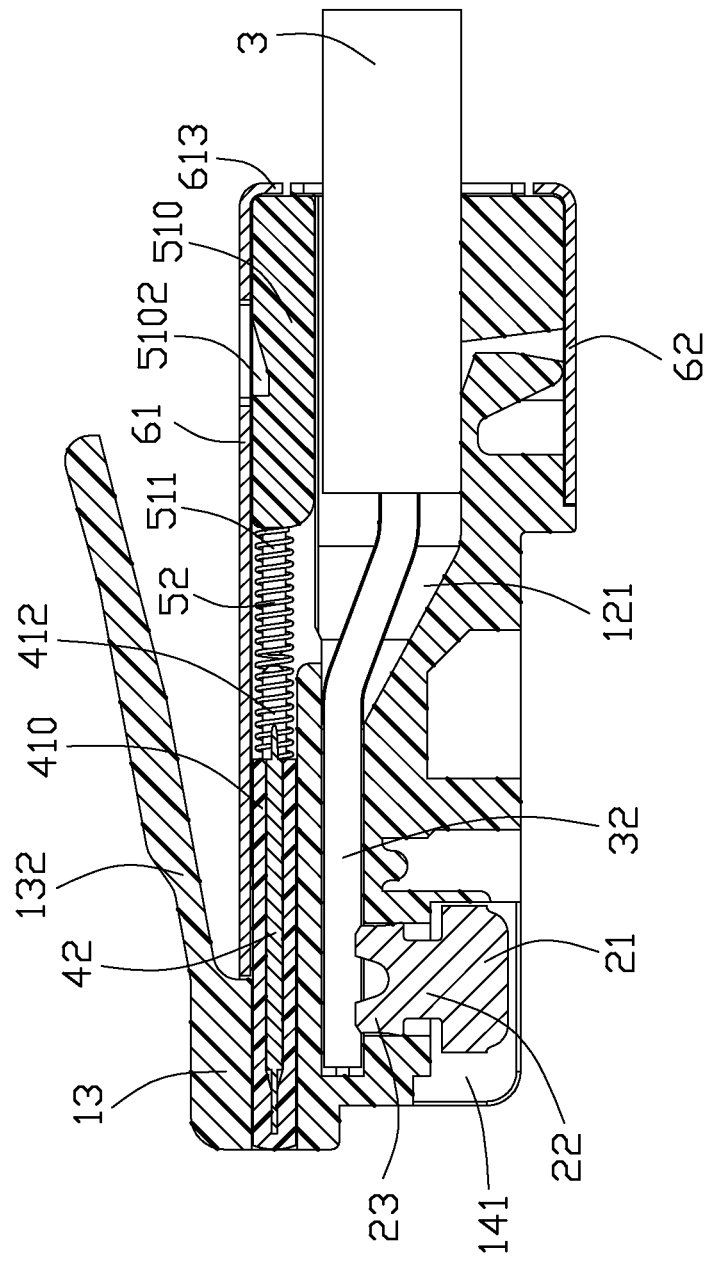
FIG. 6 is a cross-sectional view of the cable connector taken along line 6-6 of FIG. 1.

Referring to FIG. 6, the contact 2 includes a contacting portion 21 received in the groove 141, a connecting portion 22 extending upwardly from the contacting portion 21 and two piercing portion 23 extending upwardly from the connecting portion 22.

The cable 3 includes a main body 31 and a plurality of wires 32 located in the main body 31 and extending into the groove 141. The wire 32 includes a copper (no labeled) and an insulative skin 321 covering the copper. The piercing portion 23 of the contact 2 pierces the insulative skin 321 of the cable 3 to connect with the copper and electrically conduct with the cable 3.

The metal shell 6 is made of a metal plate, the metal shell 6 includes a top face 61, a bottom face 62, two side faces 63 extending downwardly from two sides of the top face 61, a receiving room 60 formed by the top, bottom and side faces 61, 62, 63 and a plurality of bending portions 613 extending inwardly toward the receiving room 60 from a rear edge of the top, bottom and side faces 61,62,63. The top face 61 extends forwardly beyond the bottom face 62. The top face 61 covers the top wall 13 of the insulative housing 1 and the bottom face 62 covers the bottom wall 14 of the insulative housing 1. The metal shell 6 includes two tabs 611 depressing into the receiving room 60 from a rear of the top face 61 and an elastic plate 612 located between two tabs 611. The side faces 63 each include a retaining tail 631 extending inwardly toward the receiving room 60.

Please refer to FIG. 6, when assemble the cable connector 100, at first, the optical fibers 42 are inserted into the accommodating slots 4111 of the spacer 410 and couple with the optical lens 413 which is retained in the front of the accommodating slot 4111. Then, the spacer 410 is inserted into the receiving space 121 of the insulative housing 1, with the extending portion 411 retained in the through hole 133 of the convex 131. One end of the spring 52 surrounds in the post 511 of the positioning block 51. The positioning block 51 is inserted into the passageway slot 136 forwardly and horizontally. At the same time, the other end of the spring 52 surrounds the resisting post 412 of the optical module 41 and forwardly resists a rear of the spacer 410. The locking portion 5101 is received in the retaining slot 1361 completely. Though the spring 52 has an elastic deformation and forces the positioning block 51 backwardly, the positioning block 51 interferes with the retaining slot 1361 so as to retain the positioning block 51 and prevent the locking portion 5101 from moving backwardly and outside of the retaining slot 1361. The optical member 4 can move along a front-to-rear direction by urging the springs 52. The wire 32 is inserted into the groove 141 forwardly from the receiving housing 121 and the piercing portion 23 of the contact 2 pierces the insulative skin 321 of the cable 3 to connect with the copper and electrically conduct with the cable 3. Finally, the metal shell 6 covers the insulative housing 1 along a front-to-rear direction. The tab 611 of the metal shell 6 latches with the recessing hole 137 of the insulative housing 1, the retaining tail 631 is received in the opening slot 142 and the elastic plate 612 latches in the depression 5102 to fix the positioning portion 51.

The positioning portion 5 and the optical member 4 are mounted in the insulative housing 1 along a back to front direction. One end of the spring 52 resists the positioning block 51, another end resists the optical module 41, and the positioning block 51 together with springs 52 are inserted into the insulative housing 1 horizontally. The connector 100 would be assembled easily, and the spring 52 is retained reliably. It is also noted that in the instant invention the optical member 4 is contained/retained in the space provide around the convex 131 which is the existing structure in the traditional RJ45, thus requiring no changes for the contour of this hybrid type connector of the instant invention in comparison with the conventional RJ45.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cable connector comprising:
an insulative housing having a pair of opposite front and rear walls, a pair of opposite top and bottom walls and a receiving space depressing forwardly from the rear wall;
a plurality of contacts retained in the insulative housing;
a cable received in the receiving space and connecting with the contacts;
an optical member retained in the insulative housing and being movable along a front-to-back direction; and
a retaining member having a pair of springs forwardly resisting the optical member and a positioning block forwardly resisting the springs and assembled to the insulative housing;
wherein the insulative housing has a plurality of grooves penetrating through the bottom wall and the front wall, the cable has a plurality of wires received in the grooves, the contacts are retained into the grooves upwardly and pierce insulative skins of the cable to electrically conduct with the wires.

2. The cable connector as claimed in claim 1, wherein the positioning block is assembled in the insulative housing horizontally along a back-to-front direction.

3. The cable connector as claimed in claim 1, wherein the positioning block has a main body and a pair of posts extending forwardly from the main body, one end of each spring surrounds the corresponding post and backwardly resists the main body.

4. The cable connector as claimed in claim 3, wherein the optical member has a optical module and an optical fiber connecting with the optical module, the optical module comprises a spacer, two extending portions extending forwardly from the spacer, a pair of resisting posts extending backwardly from the spacer and two optical lenses retained in the extending portion and exposed outside, the other end of each spring surrounds the corresponding resisting post and forwardly resists the spacer.

5. The cable connector as claimed in claim 4, wherein the top wall of the insulative housing includes a convex extending forwardly therefrom, the convex has a receiving slot passing therethrough and a plurality of through holes communicating the receiving slot to exterior space, the optical module is received in the receiving slot and the extending portions are received in the through holes.

6. The cable connector as claimed in claim 5, wherein the top wall of the insulative housing includes a passageway slot located behind the receiving slot and passing backwardly therethrough and two retaining slots defined on two sidewalls of the passageway slot, the positioning block has two locking portions interfering with the retaining slots to retain the positioning block to the insulative housing, each locking portion is thinner than the main body.

7. The cable connector as claimed in claim 6, wherein the each locking portion has a same length as that of each retaining slot.

8. The cable connector as claimed in claim 1, further comprising a metal shell covering the insulative housing, the metal shell includes a top face, a bottom face, two side faces extending downwardly from the top face and a receiving room formed by the top, bottom and side faces, the top face and side faces extend forwardly beyond the bottom face, the top face includes two tabs depressing from a rear thereof and a plurality of bending portions extending inwardly toward the receiving room from rear edges of the top, bottom and side faces, the side faces each include a retaining tail extending inside thereof, the top wall includes recessing holes located in two sides of the top wall and the bottom wall includes a plurality of opening slots located behind the grooves, the insulative housing is received in the receiving room, the tabs latch with the recessing holes, the retaining tails latch with the opening slots and the bending portions abut against the positioning block.

9. The cable connector as claimed in claim 8, wherein the positioning block has a depression, the top face of the metal shell has an elastic plate located between the two tabs and latching with the depression.

10. A cable connector comprising:
an insulative housing having a pair of opposite front and rear walls, a pair of opposite top and bottom walls and a receiving space depressing forwardly from the rear wall, the top wall having a passageway slot passing backwardly therethrough and two retaining slots located in two sides of the passageway slot;
a plurality of contacts retained in the insulative housing;
an optical member retained in the insulative housing; and
a retaining member located behind the optical member, the retaining member having a positioning block assembled to the insulative housing along back-to-front direction and a spring forwardly resisting the optical member and backwardly resisting the positioning block.

11. The cable connector as claimed in claim 10, wherein the positioning block is assembled in the insulative housing horizontally after the optical member and interferes with the insulative housing to be fixed.

12. The cable connector as claimed in claim 10, wherein the positioning block has a main body and a post extending forwardly from the main body, one end of the spring surrounds the post and backwardly resists the main body.

13. The cable connector as claimed in claim 12, wherein the optical member has an optical module and an optical fiber connecting with the optical module, the optical module comprises a spacer, two extending portions extending forwardly from the spacer, a resisting posts extending backwardly from the spacer and two optical lenses retained in the extending portions and exposed outside, another end of the spring surrounds the resisting post and forwardly resists the spacer.

14. The cable connector as claimed in claim 13, wherein the top wall of the insulative housing includes a convex extending forwardly therefrom, the convex has a receiving slot passing therethrough and a plurality of through holes communicating the receiving slot to exterior space, the optical module is received in the receiving slot and the extending portions are received in the through holes.

15. The cable connector as claimed in claim 14, wherein the top wall of the insulative housing includes a passageway slot located behind the receiving slot and passing backwardly therethrough, and two retaining slots defined on two sidewalls of the passageway slot, the passageway slot connects with the receiving space, the positioning block has two locking portions interfering with the retaining slots to retain the positioning block, each locking portion is thinner than the main body.

16. An RJ45 connector for mating with a modular jack, comprising:
an insulative housing defining opposite contacting face and retaining face in a vertical direction;
a protrusion associated with the housing around the retaining face and extending beyond both a front face and the retaining face of the housing with a resilient latch extending rearwardly therefrom the protrusion, said resilient latch defining a latching shoulder for latching to the modular jack, and deflectable in a vertical direction around the retaining face for releasing from the modular jack;
a receiving slot formed around the protrusion along a front-to-back direction perpendicular to said vertical direction;
a plurality of grooves extending in the contacting face along said front-to-back direction perpendicular to said vertical direction;
a plurality of contacts disposed in the corresponding grooves, respectively, with contacting sections thereof for mating with said modular jack;
a plurality of wires connected to the corresponding contacts, respectively, and extending rearwardly out of the housing;
an optical module received in the receiving slot with lens mechanism forwardly communicated with an exterior via a through hole in a front surface of the protrusion; and
a plurality of optic fibers coupled to the optical module and extending rearwardly out of the housing; wherein
said optical module is equipped with a retaining member for providing a forward force.

17. The RJ45 connector as claimed in claim 16, wherein said retaining member includes spring mechanism to generate said forward force.

18. The RJ45 connector as claimed in claim 16, wherein the receiving slot is configured to allow the optical module to be assembled thereinto forwardly in the front-to-back direction.

19. The RJ 45 connector as claimed in claim 16, wherein another through hole extends through the front face of the protrusion beside said through hole for receiving a post of the modular jack.

* * * * *